(12) United States Patent
Duenow

(10) Patent No.: US 6,729,264 B2
(45) Date of Patent: May 4, 2004

(54) LIVESTOCK WATERING APPARATUS

(76) Inventor: Michael Duenow, 1729 Homestead Ct., Fulton, MO (US) 65251

( * ) Notice: Subject to any disclaimer, the term of this patent is extended or adjusted under 35 U.S.C. 154(b) by 0 days.

(21) Appl. No.: 10/237,810

(22) Filed: Sep. 9, 2002

(65) Prior Publication Data

US 2004/0045510 A1 Mar. 11, 2004

(51) Int. Cl.[7] ............................. A01K 7/02; A01K 7/06
(52) U.S. Cl. ........................................ 119/75; 119/73
(58) Field of Search ......................... 119/75, 72, 74, 119/78, 79, 80, 51.01, 51.12, 51.5, 52.1, 52.4, 53, 53.5, 54, 56.1, 61, 62, 73

(56) References Cited

U.S. PATENT DOCUMENTS

| | | |
|---|---|---|
| 351,781 A | 11/1886 | Kouns |
| 1,576,218 A | 3/1926 | Powell |
| 1,977,346 A | 10/1934 | Moorman ..................... 119/73 |
| 2,087,173 A | 7/1937 | Uden ........................... 137/68 |
| 3,221,706 A | 12/1965 | Johnson ....................... 119/73 |
| 3,306,263 A | 2/1967 | Johnson ....................... 119/73 |
| 3,949,707 A | 4/1976 | Armstrong et al. ........... 119/73 |
| 4,180,015 A | 12/1979 | Dawson, Jr. .................. 119/78 |
| 4,196,699 A | 4/1980 | Leeming ...................... 119/81 |
| 4,440,112 A | 4/1984 | Lilyerd ........................ 119/73 |
| 4,584,966 A | 4/1986 | Moore .......................... 119/73 |
| 4,625,680 A | 12/1986 | Hogan .......................... 119/74 |
| 4,844,014 A | 7/1989 | Gershman ..................... 119/18 |
| 4,976,220 A | 12/1990 | Gershman ..................... 119/18 |
| 5,003,928 A | 4/1991 | Ketterlin et al. .............. 119/73 |
| 5,146,873 A | 9/1992 | Gray ............................ 119/73 |
| 5,474,029 A | 12/1995 | Hofer ........................... 119/73 |
| 5,740,760 A | 4/1998 | Winebrenner ................ 119/73 |
| D438,347 S | 2/2001 | Petersen .................... D30/121 |
| D447,839 S | 9/2001 | Rasmussen ................ D30/131 |

FOREIGN PATENT DOCUMENTS

GB          2222929 A   *   3/1990   ............ A01K/7/02

* cited by examiner

Primary Examiner—Son T Nguyen
(74) Attorney, Agent, or Firm—Suelthaus PC (57) ABSTRACT

A livestock watering apparatus having a housing having a moveable door, a reservoir, and a valve system connected to a water source. The moveable door in combination with the valve mechanism provides a continuous flow of water to the water reservoir and allows animals to receive fresh water that is maintained at a desired level throughout the year.

20 Claims, 7 Drawing Sheets

FIG. 7

LIVESTOCK WATERING APPARATUS

FIELD OF THE INVENTION

The present invention relates to a watering apparatus and more particularly, to a livestock watering fountain for outdoor use.

BACKGROUND OF THE INVENTION

A technical problem recognized with respect to conventional livestock watering systems relates to the flow and maintenance of water levels. Few water fountains provide for the maintenance of water levels for animals in an expansive area such as a field. In addition, most watering systems do not provide for extreme temperatures in winter when water often freezes. Accordingly, it is an aspect of the present invention to provide continuous flow of water and the maintenance of particular water levels that allow an animal to consume water.

Another technical problem related to conventional livestock watering systems includes the inability to provide continuous flow of water to animals in an extensive area. Conventional systems provide a trough of water near feeding sources, but they do not provide relief for animals that are grazing or feeding in an open field. Accordingly, it is an aspect of the present invention to provide an improved livestock watering system that provides a continuous flow of water and regulates the amount of water in the system so that animals may receive fresh water at various locations in a large area of land at any time of the year.

Another technical problem related to conventional livestock watering systems includes failure due to ice. Ice may freeze the mechanical features of some watering systems rendering them useless. Further, ice may simply block the livestock's access to the water.

SUMMARY OF THE INVENTION

Embodiments, including the technical features of the invention for which protection is sought, are illustrated and described herein and include a livestock watering system including a water source, a valve mechanism, and a housing having a reservoir which contains water for the livestock watering apparatus.

The housing of the present invention extends above and below ground level and includes a door, which allows an animal to nudge the door to receive direct access to water retained in a water reservoir. A valve mechanism connects the pressurized water source and a housing to trigger water flow into the reservoir when the door on the housing is opened.

The watering apparatus of the present invention may be utilized in a field, feed lot or any other area where livestock require water.

The watering apparatus of the present invention provides for the expulsion of ice from the water reservoir. Pressurized water may lift the ice out of the water reservoir, melt the ice, and/or break the ice.

These and other aspects and features of the present invention will be better understood and appreciated in the following detailed description of one embodiment thereof selected for purposes of illustration and shown in the accompanying drawings.

DETAILED DESCRIPTION OF THE INVENTION

Figure 1:
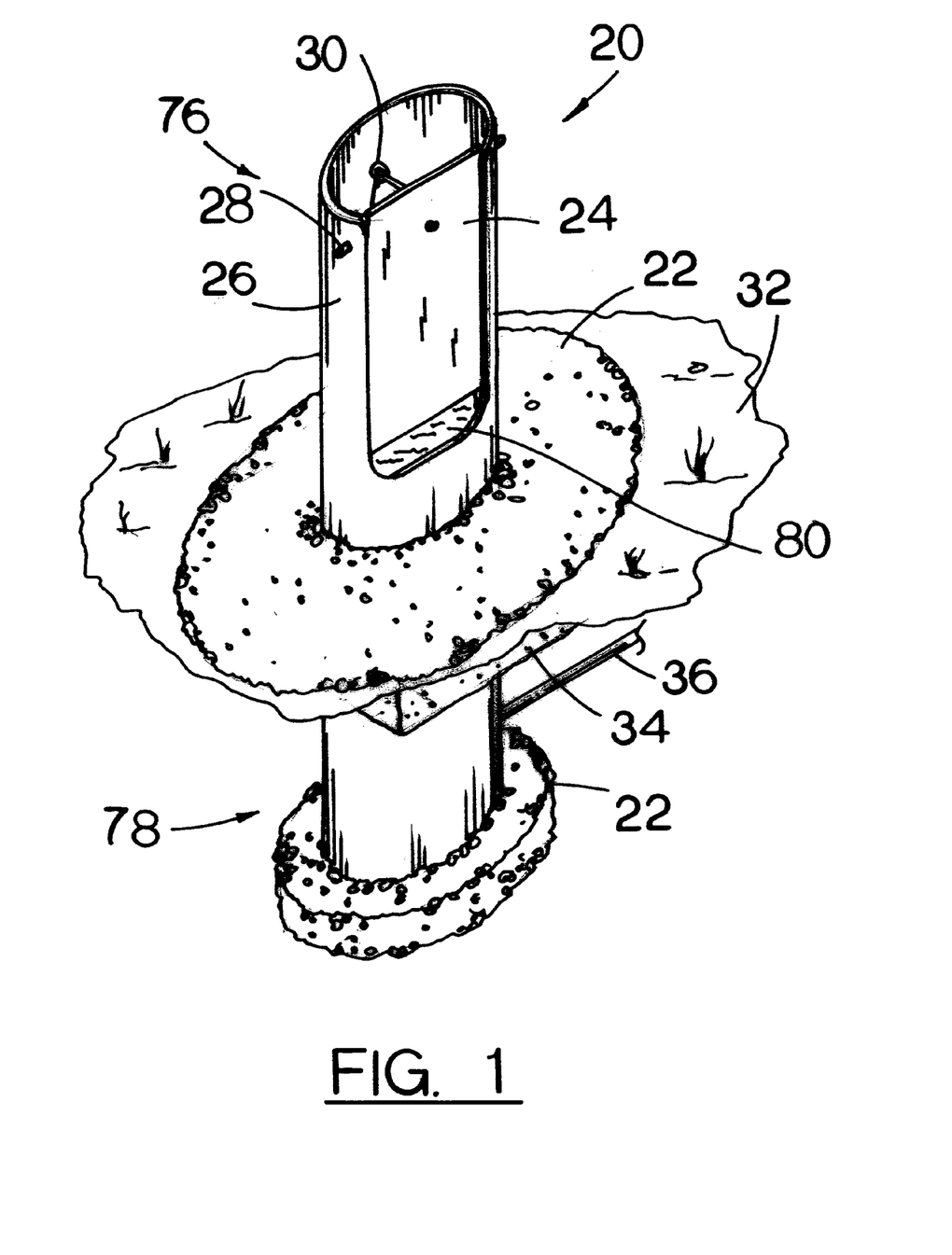
FIG. 1 is a perspective view of a livestock watering system illustrating the principles of the invention.
Figure 2:
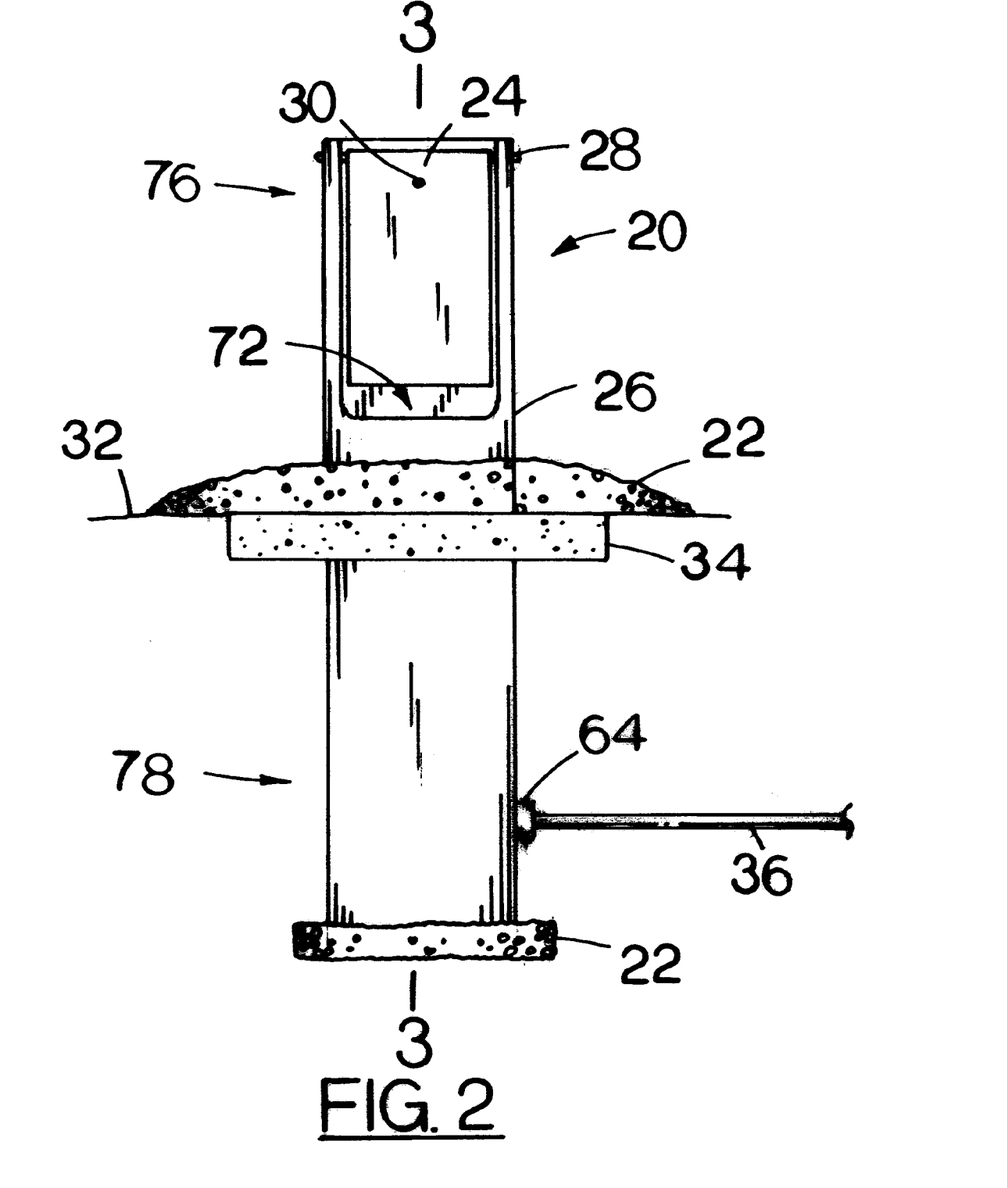
FIG. 2 is a front view of the livestock watering system of the present invention.

Referring now to the figures, there is shown preferred embodiments for the livestock watering system of this invention, including the technical features of the invention for which protection is sought. Referring to FIG. 1, an improved livestock watering system 20 is illustrated. The livestock watering system 20 comprises a housing 26 having a door 24, a pressurized water source 36, and a valve mechanism 66 that controls the flow of water into a water reservoir 44 from the water source 36. The valve mechanism 66 (shown in FIG. 3) is generally activated by the movement of the door 24 connected to the housing 26. The housing 26 comprises a unitary piece having two portions, an upper portion 76 that extends above ground 32 and a lower portion 78 that remains mostly in the ground 32. In a preferred embodiment, the housing 26 is shown and described as having a substantially cylindrical shape, however, it is understood that the housing may comprise any geometric shape that could provide for a door allowing access to the water reservoir.

Figure 3:
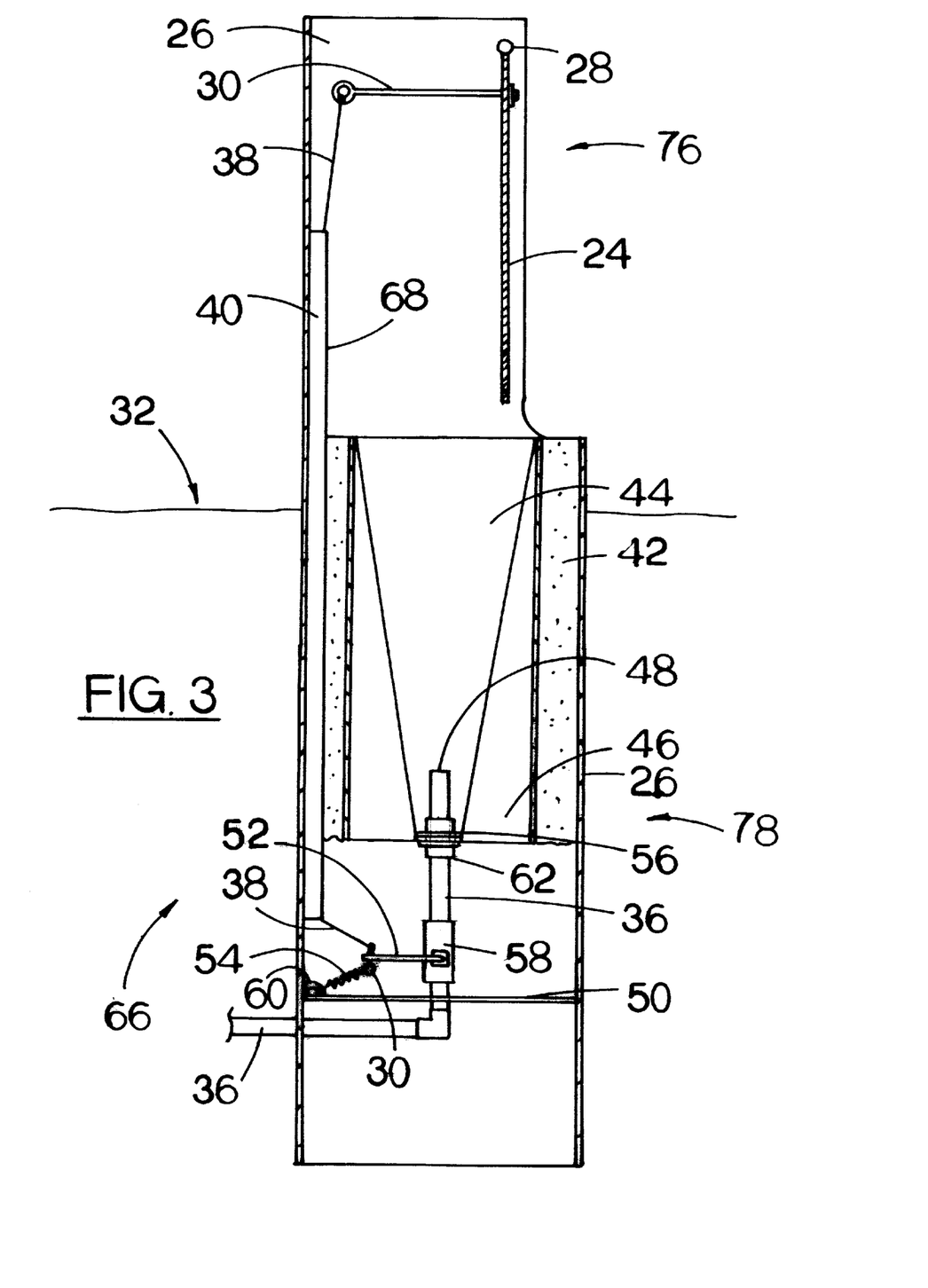
FIG. 3 is a cross-sectional elevational view of the livestock watering system of FIG. 2 taken along the line 3—3.

The lower portion 78 is mostly in the ground 32 and contains the water reservoir 44. The water source 36 is connected to the lower portion 78 by a coupler 64, which secures the water source 36 to the housing 26. Preferably, the housing is secured at two locations using concrete 34 and/or gravel 22. The concrete 34 and the gravel 22 at the base of the housing 26 and at the ground level 32 secures the housing 26. The gravel 22 and/or concrete 34 may also be used to secure the housing 26 in position in the ground.

The upper portion of the housing 26 includes a door 24, which partially covers an opening 72 in the upper portion of the housing. In a preferred embodiment of the invention, the door 24 has a length that is shorter than the length of an opening 72 in the upper portion 76. Therefore, a small opening between the bottom of the opening 72 and the bottom of the door 24 is formed and allows an animal to see water in the water reservoir 44 without pushing the door 24. The small opening also assists in allowing ice to be expelled from the top of the water reservoir 44, as the small opening provides clearance for the ice to exit from the water reservoir 44. Further, the distance between the bottom of the door 24 and water 80 helps reduce the likelihood of the door 24 freezing to the water 80. In a preferred embodiment of the invention, the door 24 has a length of about fifteen inches, and the opening 72 has a length of about eighteen inches.

The door 24 is connected to the housing 26 such that the door 24 can swing without restraint. The door 24 is connected to the housing 26 by a rod 28 to allow the door to swing freely. The rod 28 may either extend horizontally through the door 24 from one side of the opening 72 to the other; or two rods may connect the door 24 to the housing 26 without extending through the door 24. In some embodiments, the door 24 is connected to the housing 26 by a hinge.

Not only is the door 24 useful in protecting the water from debris and other matter, but it also functions to activate the valve mechanism 66 of the livestock water apparatus 20. Affixed to the door 24 is an eyebolt 30. The eyebolt 30 is connected to a cable 38, which connects the door 24 to the valve mechanism 66 in the lower portion 78 of the housing 26. From the eyebolt 30, the cable 38 extends down through a cable housing 40 that is affixed to an inner surface of the housing 26. The cable housing 40 is preferably ½" polyvinyl chloride (PVC) pipe. The cable housing 40 extends through portions of the upper portion 76 and lower portion 78. The cable housing 40 protects and encloses the cable 38. The cable housing 40 may optionally comprise one or more guides 68. The guides 68 may define a circular opening through which the cable 38 passes through. In some embodiments, the cable housing 40 is replaced with a series of guides 68. The cable 38 is connected generally to the valve mechanism 66 and, more specifically, it is connected to a lever 52. The lever 52 activates a valve 58 and thereby allows water from the water source 36 to enter into the water reservoir 44.

Figure 4:
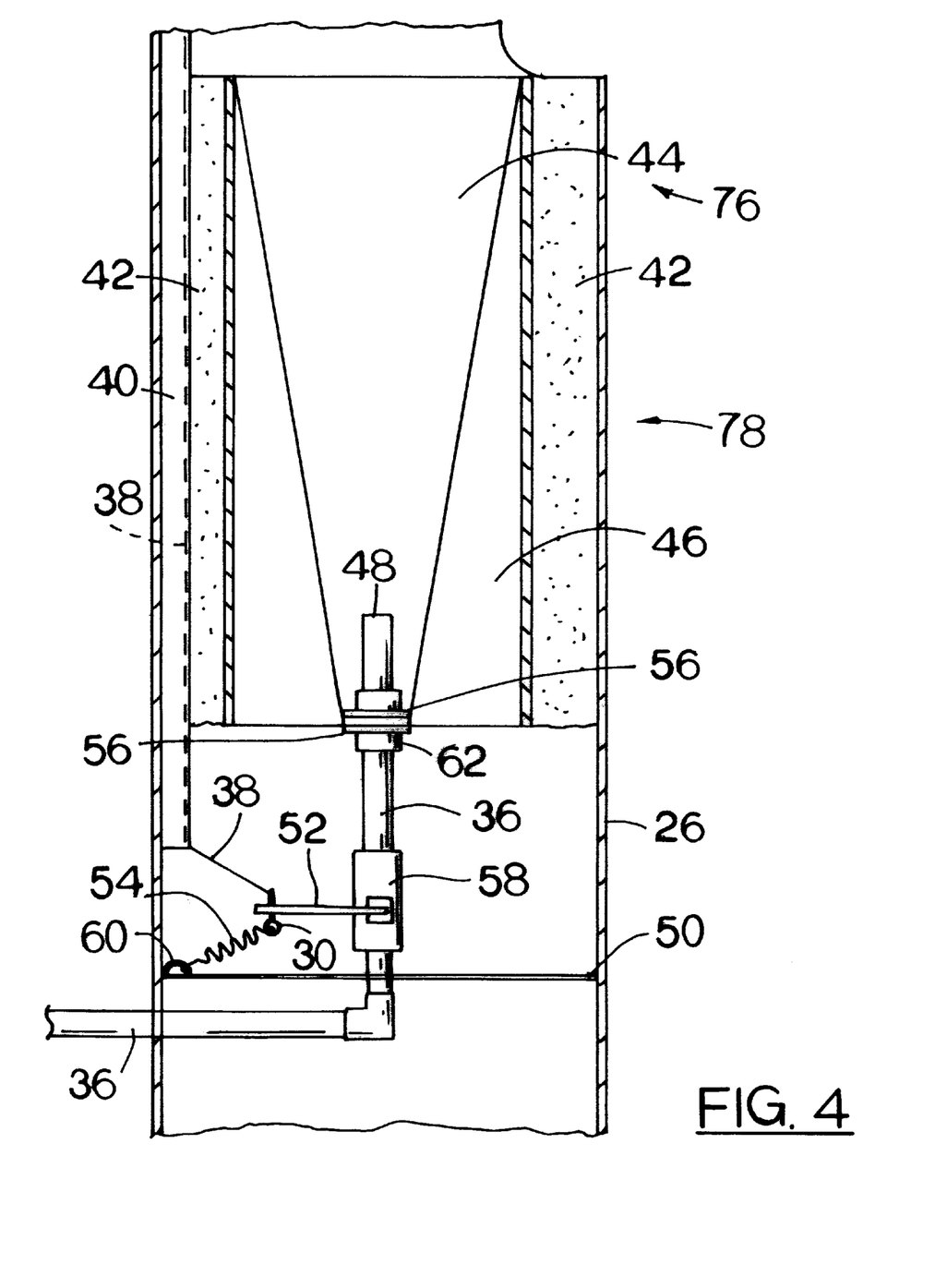
FIG. 4 is a detailed view of the valve mechanism shown in FIG. 3.
Figure 5:
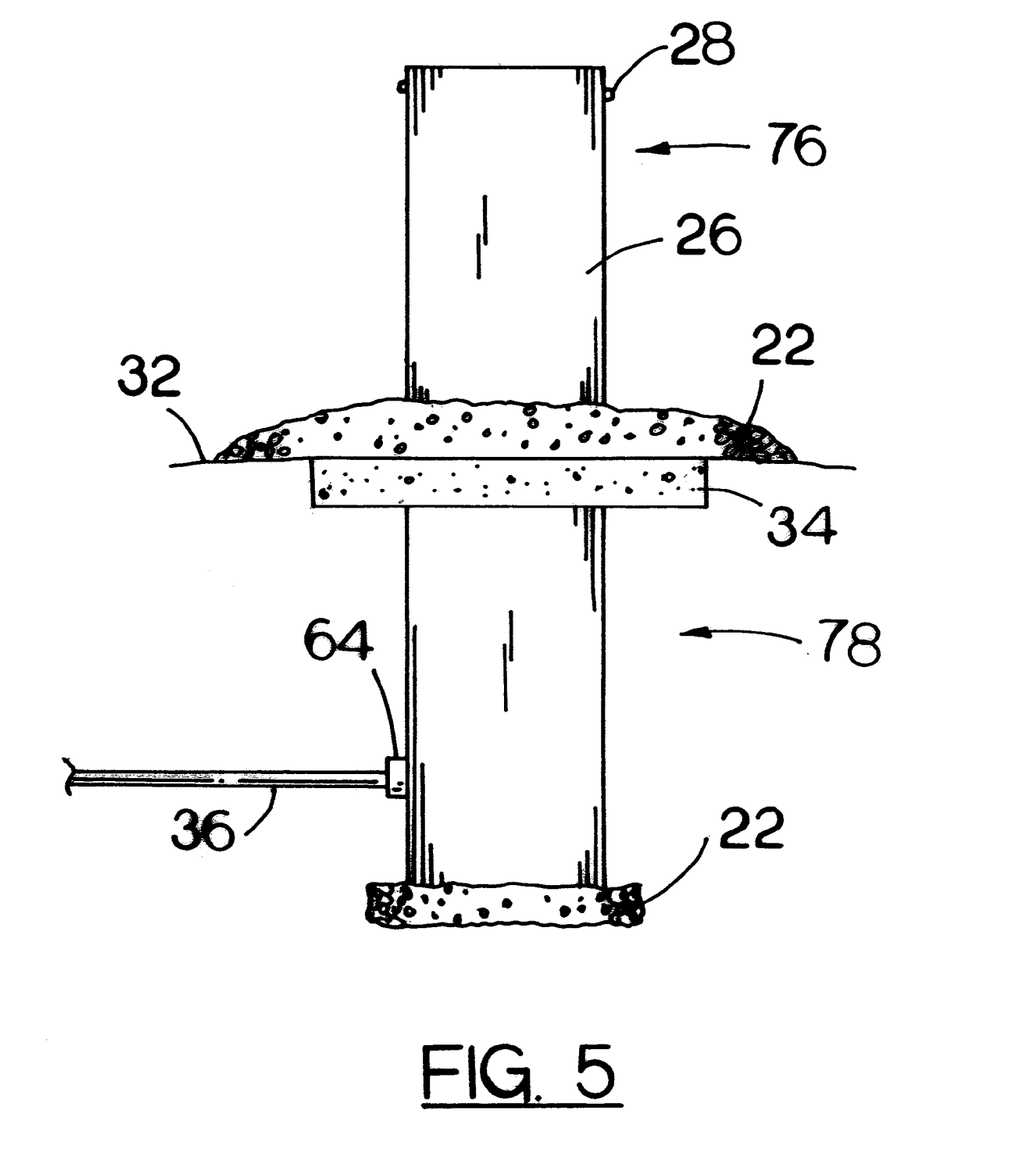
FIG. 5 is a rear elevation view of the livestock watering system of the present invention.
Figure 6:
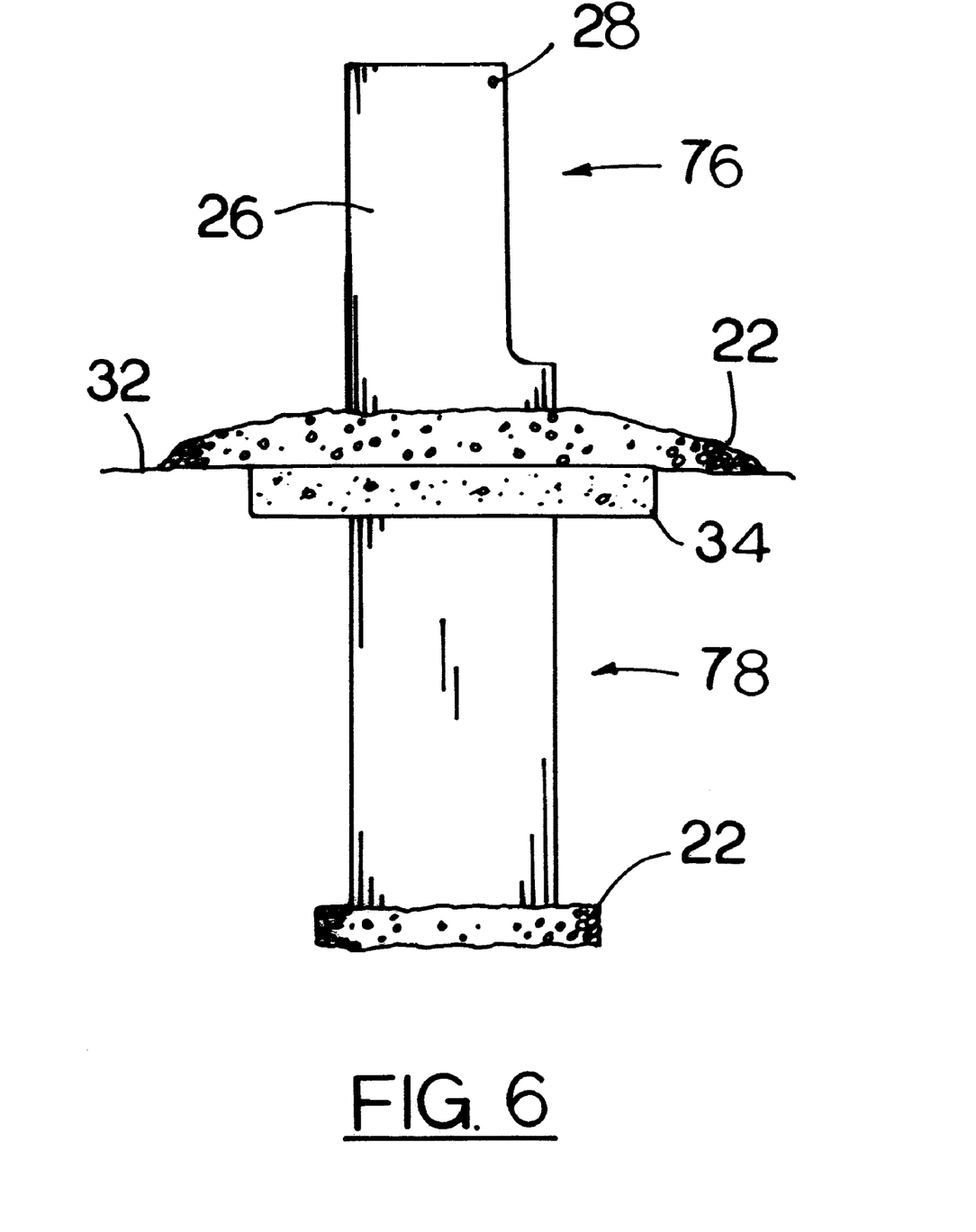
FIG. 6 is a left view of the livestock watering system of the present invention.
Figure 7:
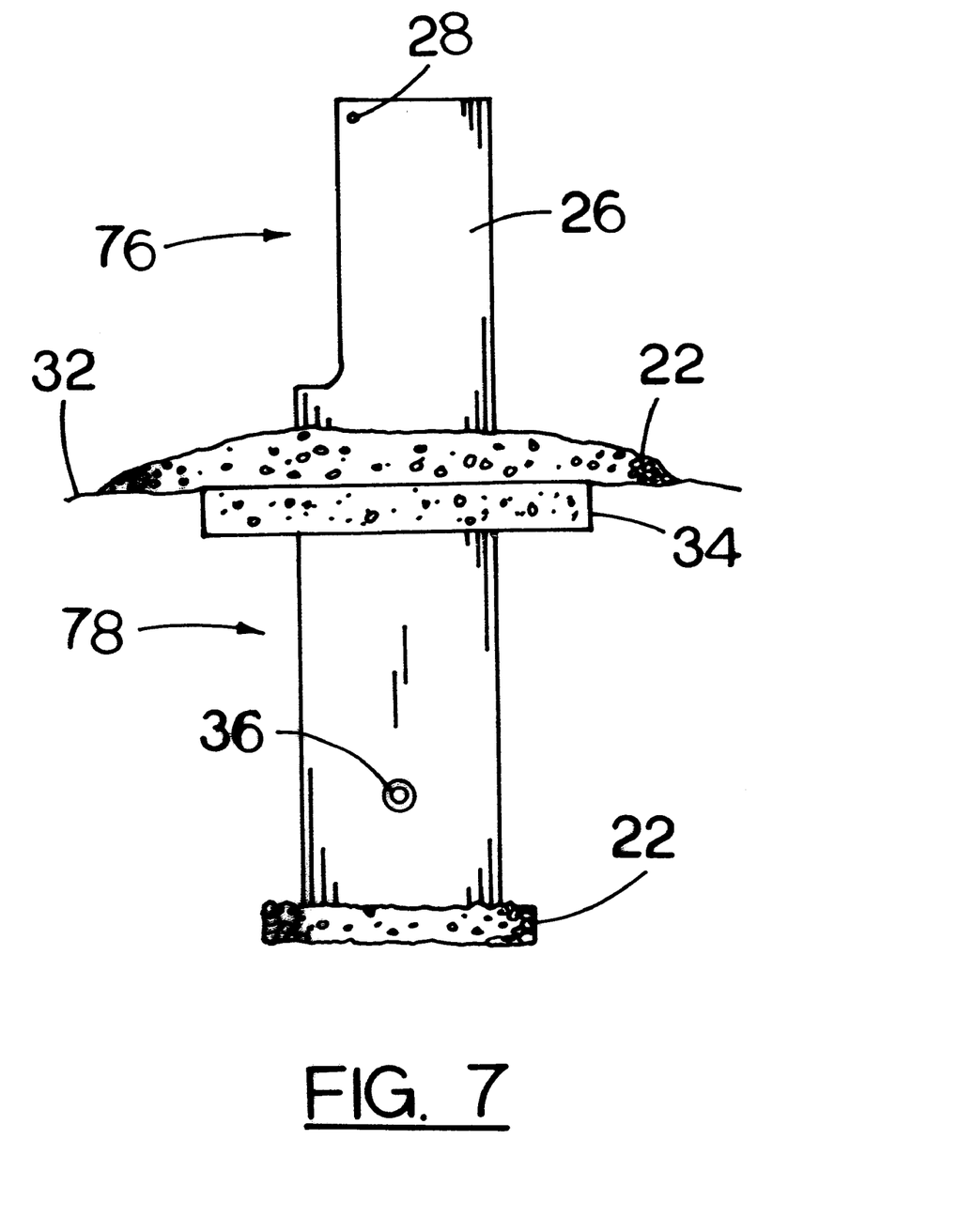
FIG. 7 is a right view of the livestock watering system of the present invention.

As shown in FIG. 3, the valve mechanism 66 comprises a lever and spring combination to operate the flow of water into the water reservoir 44. A hook 60 is mounted to the inner surface of the lower portion of the housing 26. A spring 54 connects the hook 60 and an eyebolt 30 that is affixed to a lever 52. When lever 52 moves, it opens valve 58 and allows water to flow from the water source 36 and enter into the water reservoir 44 through an inlet 48. The water source 36 is connected to the water reservoir 44 by a pipe sleeve 62 and at least two washers 56, which secure the water source 36 to the water reservoir 44. In a preferred embodiment of the invention, silicone is placed in between the washers 56.

The water reservoir 44 and the water source 36 are in fluidic communication. The water 80 enters the water reservoir 44 through an inlet 48 and is triggered by movement of the door 24. An animal may access the water contained in the water reservoir 44 by nudging the door 24 toward the center of the housing 26. Within the lower portion 78 of the housing 26, the water reservoir 44 is encased in an inner housing 46. In a preferred embodiment of the invention, the water reservoir 44 has a conical shape such that the water inlet 48 is located at the vertex of the conical water reservoir 44. The inner housing 46 has a tubular or spherical shape such that there are insulating air gaps formed between the outer surface of the water reservoir 44 and the inner surface of the inner housing 46. Due to the nature of the different shapes of the water reservoir 44 and the inner housing 46, the air gaps are formed such that a larger mass of air is formed near the water inlet 48. These air gaps help provide insulation. The conical water reservoir 44 also assists in expelling ice from the water reservoir 44. As water 80 enters the water reservoir 44, it pushes up on any ice which has collected on the surface of the water reservoir 44. Since the water reservoir 44 is conical-shaped, the ice is moving to a larger area and may be expelled from the water reservoir 44. The water 80 may also melt or break the ice instead of or in addition to expelling the ice.

The inner housing 46 may also be surrounded by foam insulation 42. The foam insulation 42 further insulates the water reservoir 44 to prevent the water from freezing in inclement weather.

In operation, an animal will nudge the door 24 with its head, whereby the door 24 will move toward a center of the upper portion 76 of the housing 26. The cable 38, which is affixed to both the door 24 and the valve mechanism 66, will trigger and extend the spring 54, and thereby, the lever 52. The upward movement of the lever 52 will allow the valve 58 to open and cause the water 80 from the water source 36 to flow into the water reservoir 44 by passing through the water inlet 48. After the animal has finished drinking and removes its head from the door 24, the valve mechanism 66 will close as the cable 38 is no longer extending the spring 54.

In some embodiments, as the door 24 is opened more, greater force is applied to the lever 52 and more water is released from the valve 58. This feature controls the amount of water released into the water reservoir. Thus, a larger animal that opens the door 24 wider than a smaller animal will cause more water to be released into the water reservoir 44.

The present invention provides for an automated livestock watering apparatus. The water reservoir 44 is automatically refilled as the livestock drinks from the watering apparatus and thus the water level in the water reservoir 44 is generally maintained constant. The present invention also provides for the removal, breaking, and/or melting of ice that may form on the surface of the water reservoir 44. The present invention also provides many insulating features to prevent the underground mechanical components from freezing.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalent.

What is claimed is:

1. A livestock watering apparatus comprising:
   a housing having an upper portion and a lower portion;
   the lower portion comprising a conical-shaped water reservoir to assist in expulsion of any ice;
   a pressurized water source connected to the housing by a coupler;
   a valve mechanism in the lower portion of the housing that allows water to flow into the conical-shaped water reservoir from the pressurized water source;
   a door attached to the upper portion; and
   a cable affixed to the door and connected to the valve mechanism.

2. The livestock water apparatus as set forth in claim 1, wherein the door is connected to the housing such that the door is capable of swinging inward toward a center of the housing.

3. The livestock watering apparatus as set forth in claim 2, wherein the swinging of the door inward toward the center of the housing activates the valve mechanism.

4. The livestock water apparatus as set forth in claim 1, wherein the cable extends through a cable housing.

5. The livestock watering apparatus as set forth in claim 4, wherein the cable housing is a polyvinyl chloride pipe.

6. The livestock watering apparatus as set forth in claim 1, wherein the valve mechanism comprises a lever and a spring.

7. The livestock watering apparatus as set forth in claim 6, wherein the spring connects to a hook and an eyebolt, wherein the eyebolt is affixed to the lever.

8. The livestock watering apparatus as set forth in claim 7, wherein the valve is activated by the movement of the lever.

9. The livestock watering apparatus as set forth in claim 1, wherein the water source is connected to the conical-shaped water reservoir by a pipe sleeve and at least two washers.

10. The livestock watering apparatus as set forth in claim 1, wherein water flows into the conical-shaped water reservoir through an inlet.

11. The livestock watering apparatus as set forth in claim 1, wherein the water source is located at a vertex of the conical-shaped water reservoir.

12. The livestock watering apparatus as set forth in claim 1, wherein the lower portion of the housing further comprises an inner housing that encases the conical-shaped water reservoir.

13. The livestock watering apparatus as set forth in claim 12, wherein the inner housing comprises a tubular or spherical shape.

14. The livestock watering apparatus as set forth in claim 13, wherein air gaps are formed in between the inner housing and the conical-shaped water reservoir.

15. The livestock watering apparatus as set forth in claim 12, wherein foam insulation surrounds the inner housing.

16. The livestock watering apparatus as set forth in claim 1, wherein the upper portion further comprises an opening, and the door substantially fills the opening.

17. A The livestock watering apparatus as set forth in claim 1, wherein the upper portion further comprises an opening, and the door fills the opening except for a gap at the bottom of the opening.

18. The livestock watering apparatus as set forth in claim 1, wherein the door is above the conical-shaped water reservoir.

19. A method of activating a livestock watering apparatus comprising:

attaching a door to an upper portion of a housing such that the door is capable of swinging toward a center of the housing;

providing a conical-shaped water reservoir in a lower portion of the housing to assist in the expulsion of ice;

providing a pressured water source in fluidic communication with the conical-shaped water reservoir;

attaching a cable between the door and the water source; and swinging the door activates the water source to release water into the conical-shaped water reservoir.

20. A livestock watering apparatus comprising:

a housing having an upper portion and a lower portion;

the lower portion comprising a conical-shaped water reservoir to assist in expulsion of any ice;

a pressurized water source connected to the housing;

a valve mechanism in the lower portion of the housing that allows water to flow into the conical-shaped water reservoir from the pressurized water source;

a door attached to the upper portion, wherein the door is above the conical-shaped water reservoir; and the door connected to the valve mechanism such that when livestock push on the door the valve mechanism causes water to flow into the conical-shaped water reservoir.

* * * * *